United States Patent [19]
Collins

[11] Patent Number: 4,530,309
[45] Date of Patent: Jul. 23, 1985

[54] ANIMAL SUPPORT HARNESS

[76] Inventor: Doris A. Collins, 1018 Nicks La., South Hill, Va. 23970

[21] Appl. No.: 615,425

[22] Filed: May 30, 1984

[51] Int. Cl.³ .............................................. A01K 29/00
[52] U.S. Cl. .................................................... 119/96
[58] Field of Search ...................... 119/96, 106, 1, 143, 119/19, 109

[56] References Cited

U.S. PATENT DOCUMENTS

| 295,712 | 3/1884 | Anderson | 119/143 |
| 1,326,716 | 12/1919 | Dunning | 119/96 |
| 1,614,083 | 1/1927 | Plantico | . |
| 2,555,027 | 5/1951 | Clayton | 119/96 |
| 2,956,541 | 10/1960 | Rall | 119/96 |
| 2,976,840 | 3/1961 | Hugus | 119/1 |
| 3,215,117 | 11/1965 | Short | 119/1 |
| 3,241,851 | 3/1966 | Dingbaum | 280/34 |
| 3,310,034 | 3/1967 | Dishart | 119/96 |
| 4,036,179 | 7/1977 | Turner et al. | 119/96 |
| 4,324,204 | 4/1982 | Friedman | 119/96 |
| 4,385,592 | 5/1983 | Goldstein | 119/96 |

FOREIGN PATENT DOCUMENTS 197625  5/1923  United Kingdom ................. 119/96

Primary Examiner—Jay N. Eskovitz
Attorney, Agent, or Firm—Griffin, Branigan & Butler

[57] ABSTRACT

A support harness for an animal to be used in combination with an animal neck collar is disclosed. The support harness comprises a four-sided belly band having means for securing the belly band around an animal's belly. A chest strap, having one end attached to the belly band and a free end, is wrapped around the animal's chest. The free end of the chest strap is then attached to the belly band. Included are means for securing the chest strap to the neck collar. This ensures that the harness is maintained in the proper position. Handle means, attached to the belly band, are gripped by a human to assist the animal in walking and climbing stairs.

10 Claims, 2 Drawing Figures

ANIMAL SUPPORT HARNESS

BACKGROUND OF THE INVENTION

1. Field of the Invention

Many species of animals, such as certain breeds of dogs, are extremely susceptible to leg problems caused by lameness, injury, or an illness. Alternatively, the animal may have eyesight problems, causing difficulty in walking and climbing stairs. This invention relates to a support harness to be worn by an animal, such as a dog, that allows the pet owner to assist the animal in walking and climbing stairs.

2. Prior Art

U.S. Pat. Nos. 2,976,840 to Hugus; 3,215,117 to Short; and 3,241,851 to Dingbaum disclose supporting devices with wheels for dogs and other animals having weakened rear legs, primarily weakened rear legs. However, each invention interferes with the animal's bodily functions and movement, preventing the wearing of the device twenty-four hours a day. The present invention overcomes these problems. The instant invention creates no discomfort for the animal; does not interfere with bodily functions; and, can be worn at all times.

In view of the foregoing, it is an object of the present invention to provide an animal support harness that does not interfere with normal bodily functions of an animal.

An advantage of the present invention is the provision of a comfortable support harness that is wearable twenty-four hours a day.

Another advantage of the present invention is the provision of a support harness which is convenient to install and remove.

SUMMARY

A support harness has an adjustable padded belly band with two padded loop handles, one at each end of the belly band, and an integral adjustable chest strap with means for securing the chest strap to a conventional collar. The chest strap is attached to the collar for the purpose of keeping the harness in proper position and does not act as a restraint. Padding in the harness ensures that it is comfortable to wear and allows for easy handling by the animal's owner. The padded handles are comfortable for the pet owner.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
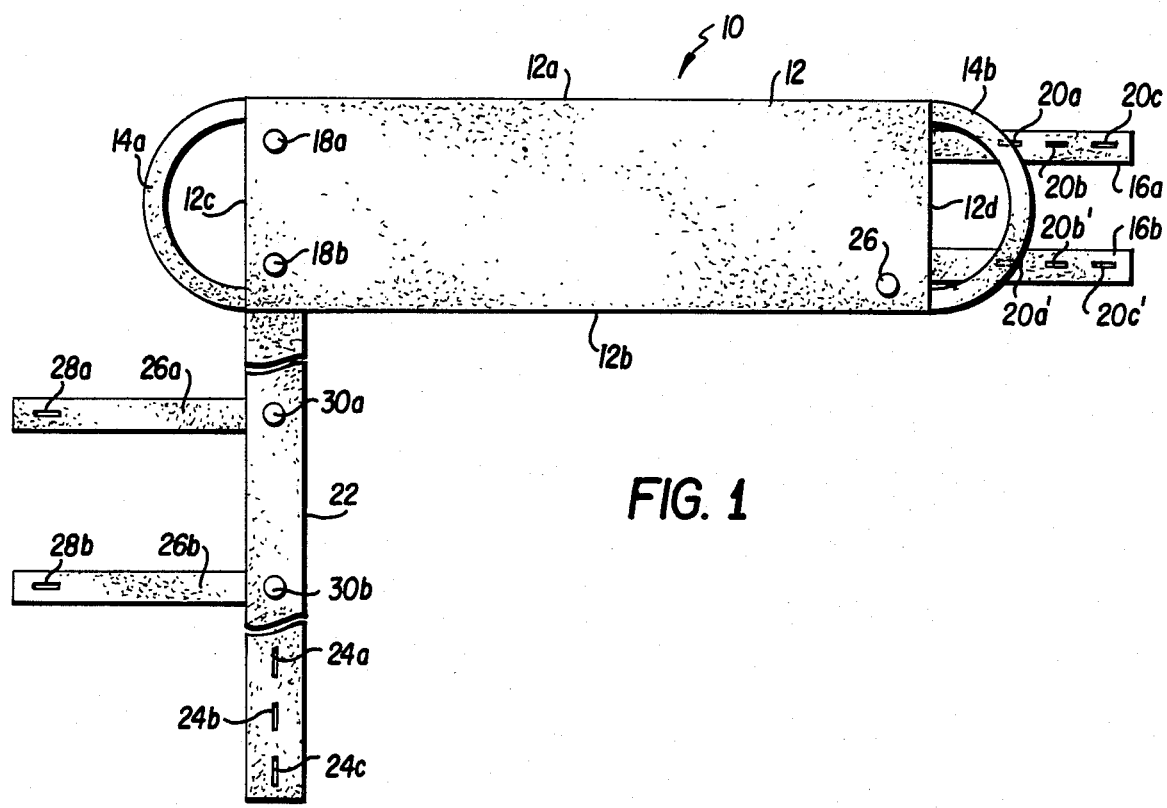
FIG. 1 is a bottom view of a support harness in its open position according to an embodiment of the invention; and, FIG. 2 is a perspective view of the support harness of the embodiment of FIG. 1 worn by an animal.

FIG. 1 shows a support harness 10 comprising an essentially rectangular belly band 12 having two opposing sides (first side 12a and second side 12b) along its major dimension and two opposing ends (second end 12c and first end 12d) along its minor dimension. Belly band 12 has handles 14a and 14b attached at ends 12c and 12d, respectively. Handles 14a and 14b are arcuate shaped or have the shape of an inverted "U" with the ends of the handles 14a, 14b being secured near opposite corners of the ends 12c, 12d. Harness 10 is made from a hand-washable, flame-resistant, non-allergenic material such as corduroy or polyester knit. Both the belly band 12 and handles 14 are filled with an appropriate padding material (not shown) that is also non-allergenic, flame-resistant and hand-washable. Polyester fiber is one example of a suitable material. The handles 14a, 14b—as are all the straps hereafter described—are sewn to the harness by double stitching with dual duty thread. In addition, the sewing of handles 14a and 14b is reinforced with carpet thread.

Two elongated rectangular body straps 16a and 16b, spaced a predetermined distance apart from each other, are sewn to the first end 12d of the belly band at points between the intersection of the first end 12d and its handle 14b. First securing means 18a and 18b, such as buttons, are sewn to the outside or underside of opposite end 12c of the belly band 12. When worn the buttons 18a and 18b lie in essentially the same vertical plane as their corresponding body straps 16a, 16b. Each body strap 16 contains a plurality of slits 20a, 20b, 20c, and 20a', 20b', 20c' to receive its respective button 18.

As seen in FIG. 1, an essentially elongated rectangular chest strap 22 is sewn perpendicularly to the lower left-hand edge of the belly band 12. That is, chest strap 22 is sewn to side 12b near the corner formed by side 12b and end 12c. The chest strap has a plurality of colinear slits 24a, 24b, 24c near its nonattached end to selectively engage a second securing means 26 attached to the lower right-hand edge (near the corner formed by side 12b and end 12d) of the belly band 12. Second securing means 26 is a button or other suitable clamping device.

Two essentially elongated rectangular collar straps 26a and 26b are sewn at right angles to the chest strap 22 and are spaced a predetermined distance apart from each other and from the second side 12b of belly band 12. Each collar strap 26a, 26b has a respective slit 28a, 28b therein to receive a corresponding third securing means 30a, 30b, such as buttons, attached to chest strap 22 near the intersection of the major axes of the straps 26 and 22.

Figure 2:
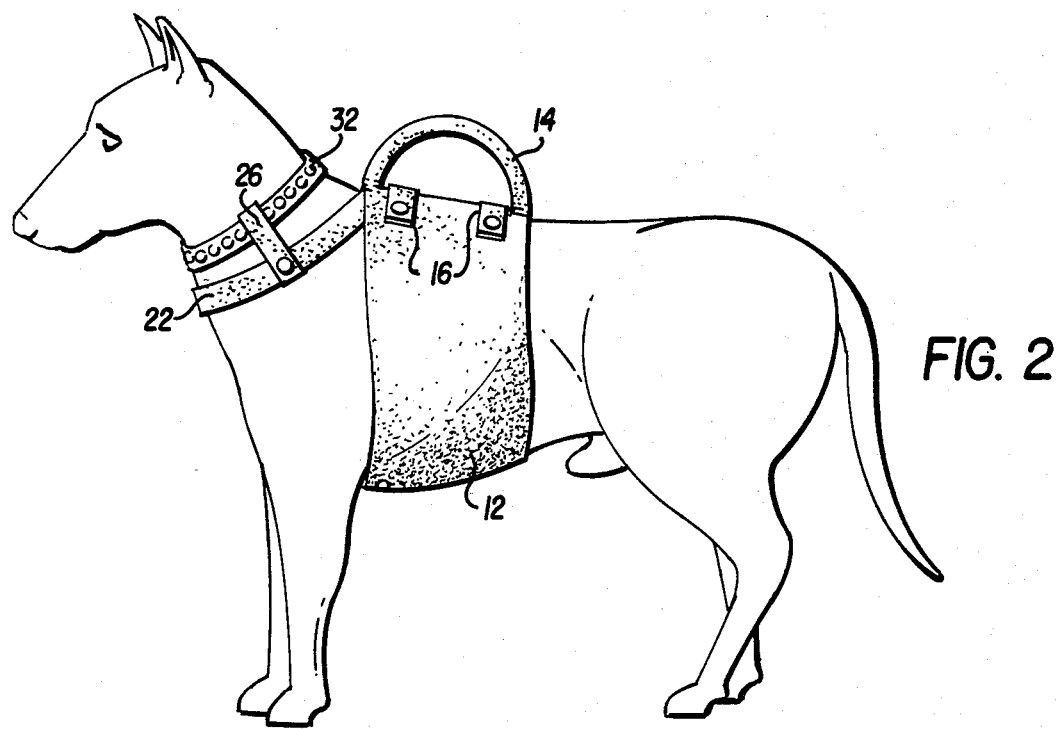

With reference to FIG. 2, the belly band 12 is placed under the belly of an animal, such as a dog, and secured by inserting the buttons 18a, 18b into slits 20 of body straps 16a, 16b, respectively. Chest strap 22 is wrapped around the animal's chest and button 26 is inserted into an appropriate one of the slits 24a, 24b, 24c according to the animal's size. Collar straps 26a, 26b are wrapped around a conventional collar 32 that the animal is already wearing. Buttons 30a, 30b are inserted into corresponding slits 28a, 28b. The collar straps 26a, 26b serve to keep the harness 10 in proper position on the animal. A human may then grip handles 14a, 14b and pull upwardly thereby relieving the animal from having to support its whole weight with its feet. With some of the animal's weight being carried by the human, the animal will find it easier to walk and climb stairs. Padding in the handles prevent discomfort and/or injury to the animal owner's hands.

While the invention has been particularly shown and described with reference to the preferred embodiment thereof, it will be understood by those skilled in the art that various alterations in form and detail may be made therein without departing from the spirit and scope of the invention. For example, Velcro TM snaps may be substituted for the buttons and slits disclosed above.

The embodiments of the invention in which an exclusive property or privilege is claimed are defined as follows:

1. A support harness for an animal for use in combination with a neck collar worn by said animal, said harness comprising:
   (a) a four-sided belly band, said belly band having two opposing ends and two opposing sides;
   (b) means for securing said belly band around the belly of said animal;
   (c) a chest strap having two ends, a first end of said chest strap being normally attached to said belly band;
   (d) means for securing the second end of said chest strap to said belly band;
   (e) means for securing said chest strap to said neck collar; and,
   (f) flexible handle means attached to said belly band whereby a human can offer support assistance to said animal, said handle means comprising an arcuate-shaped handle, the ends of said handle being secured near opposite corners of an end of said belly band.

2. A support harness as recited in claim 1, wherein said belly band securing means comprises a four-sided elongated body strap, said body strap being attached to a first end of said belly band and adapted to selectively engage locking means connected to the second end of said belly band.

3. A support harness as recited in claim 1, wherein said chest strap has an essentially elongated rectangular shape and is attached perpendicularly to a side of the belly band near a corner formed by said belly band side and an end of the belly band.

4. A support harness as recited in claim 1, wherein said means for securing said chest strap to said neck collar comprises an essentially elongated rectangular collar strap attached at a right angle to said chest strap, said chest strap being wrappable around said neck collar and attachable to a securing means near the intersection of a line parallel to the major dimension of said collar strap and a line parallel to the major dimension of said chest strap.

5. A support harness for an animal for use in combination with a neck collar worn by said animal, said harness comprising;
   (a) a four-sided belly band, said belly band having two opposing sides and two opposing ends;
   (b) a substantially rectangular body strap attached to a first end of said belly band, said body strap having a plurality of belly band engagement means thereon whereby a proper one of said body strap belly band engagement means in accordance with the size of said animal engages locking means connected to a second end of said belly band;
   (c) a rectangular chest strap, a first end of said chest strap being perpendicularly attached to a side of said belly band near a corner formed by said side and an end of said belly band;
   (d) a plurality of belly band engagement means provided on said chest strap whereby a proper one of said chest strap belly band engagement means in accordance with the size of said animal is engageable with securing means on said belly band;
   (e) a rectangular collar strap having a first end attached at a right angle to said chest strap and having a plurality of chest strap engagement means provided proximate a second end thereof, whereby said collar strap is wrappable around said neck collar and whereby a proper one of said chest strap engagement means in accordance with the size of said animal engages securing means on said chest strap; and,
   (f) flexible means attached to said belly band whereby a human can offer support assistance to said animal.

6. A support harness for an animal for use in combination with an animal neck collar worn by said animal, said harness comprising:
   (a) a four-sided belly band, said belly band having two opposing sides and two opposing ends;
   (b) a substantially rectangular body strap attached to a first end of said belly band and engagable with locking means connected to a second end of said belly band;
   (c) a rectangular chest strap, a first end of said strap being perpendicularly attached to a side of said belly band near a corner formed by said side and an end of said belly band;
   (d) means for securing a second end of said chest strap to said belly band;
   (e) a rectangular collar strap attached at a right angle to said chest strap, said collar strap wrappable around said neck collar and attachable to securing means on said chest strap; and
   (f) flexible handle means attached to a side of said belly band, said handle allowing a human to offer support assistance to said animal.

7. A support harness as recited in claim 6, wherein said locking means for said body strap comprises a button, said button selectively engaging a slit located proximate the end of the non-attached portion of said body strap.

8. A support harness as recited in claim 6, wherein the means for securing a second end of said chest strap comprises a slit proximate the second end of said chest strap and a button attached to said belly band.

9. A support harness as recited in claim 6, wherein said collar strap securing means comprises a button for selectively engaging a slit on said collar strap.

10. A support harness as recited in claim 6, wherein said holding means comprises an arcuate-shaped handle, the ends of said handle being attached to opposite corners of an end of said belly band.

* * * * *